(12) United States Patent
Kasslin et al.

(10) Patent No.: US 8,498,230 B2
(45) Date of Patent: Jul. 30, 2013

(54) POWER MANAGEMENT IN WIRELESS COMMUNICATION SYSTEMS

(75) Inventors: Mika Kasslin, Espoo (FI); Mikko Tirronen, Helsinki (FI); Kari Leppänen, Helsinki (FI); Sami Virtanen, Espoo (FI)

(73) Assignee: Nokia Corporation, Espoo (FI)

( * ) Notice: Subject to any disclaimer, the term of this patent is extended or adjusted under 35 U.S.C. 154(b) by 846 days.

(21) Appl. No.: 12/396,789

(22) Filed: Mar. 3, 2009

(65) Prior Publication Data

US 2010/0226297 A1 Sep. 9, 2010

(51) Int. Cl.
*G08C 17/00* (2006.01)
(52) U.S. Cl.
USPC .......................... 370/311; 370/462
(58) Field of Classification Search
USPC .................. 370/311, 462; 340/7.32–7.38; 455/343.1–343.6
See application file for complete search history.

(56) References Cited

U.S. PATENT DOCUMENTS

| | | | |
|---|---|---|---|
| 5,371,734 A * | 12/1994 | Fischer | 370/311 |
| 6,941,372 B2 | 9/2005 | Pearson | |
| 7,567,673 B2 | 7/2009 | Fukuzawa et al. | |
| 7,590,100 B2 | 9/2009 | Smith et al. | |
| 7,774,495 B2 | 8/2010 | Pabla et al. | |
| 7,848,277 B2 | 12/2010 | Chou et al. | |
| 7,864,720 B2 | 1/2011 | Jeyaseelan | |
| 7,907,557 B2 | 3/2011 | Carter | |
| 8,005,032 B2 | 8/2011 | Wang et al. | |
| 8,014,378 B1 | 9/2011 | Yoon et al. | |
| 2002/0101446 A1 | 8/2002 | Tang et al. | |
| 2003/0204742 A1 | 10/2003 | Gupta et al. | |
| 2004/0153676 A1 | 8/2004 | Krantz et al. | |
| 2005/0025092 A1 * | 2/2005 | Morioka et al. | 370/328 |
| 2005/0068928 A1 | 3/2005 | Smith et al. | |
| 2005/0128988 A1 | 6/2005 | Simpson et al. | |
| 2005/0193106 A1 | 9/2005 | Desai et al. | |
| 2006/0034217 A1 | 2/2006 | Kwon et al. | |

(Continued)

FOREIGN PATENT DOCUMENTS

| EP | 1 361 728 A2 | 11/2003 |
|---|---|---|
| EP | 1 396 986 | 3/2004 |

(Continued)

OTHER PUBLICATIONS

IEEE 802.11-2007, Wireless Medium Access Control (MAC) and Physical Layer (PHY) Specifications, Jun. 2007, Chapter 7.2.3.1 entitled "Beacon frame format", (pp. 80-81).

(Continued)

*Primary Examiner* — Hassan Kizou
*Assistant Examiner* — Ashil Farahmand
(74) *Attorney, Agent, or Firm* — Locke Lord, LLP

(57) ABSTRACT

Embodiments of the present invention are directed to the invocation of active states and power conservation states in accordance with the standard or diluted beacon periods defined in beacon frames. Active periods, or "awake windows," may be defined by additional information (e.g., information elements) that is included in the beacon. Awake windows may establish periods of time during which apparatuses may contend for access to a wireless communication medium. A methodology may further be employed to help determine which apparatuses will have priority when accessing the communication medium. This criteria may be used alone or in combination with the corresponding standard channel access rules (e.g., contention) that govern operation of the particular wireless communication medium in order to control how apparatuses communicate and interact in the wireless network.

21 Claims, 8 Drawing Sheets

U.S. PATENT DOCUMENTS

| | | | |
|---|---|---|---|
| 2006/0050730 A1 | 3/2006 | Shvodian | |
| 2006/0120314 A1* | 6/2006 | Krantz et al. | 370/311 |
| 2006/0215588 A1 | 9/2006 | Yoon | |
| 2006/0251004 A1 | 11/2006 | Zhong et al. | |
| 2006/0285510 A1 | 12/2006 | Kim et al. | |
| 2007/0002866 A1 | 1/2007 | Belstner et al. | |
| 2007/0086424 A1 | 4/2007 | Calcev et al. | |
| 2007/0086426 A1* | 4/2007 | Bonta et al. | 370/350 |
| 2007/0127427 A1 | 6/2007 | Tanaka | |
| 2007/0226777 A1 | 9/2007 | Burton et al. | |
| 2007/0254596 A1 | 11/2007 | Corson et al. | |
| 2008/0025512 A1 | 1/2008 | Nakajima | |
| 2008/0125190 A1 | 5/2008 | Jan et al. | |
| 2008/0130543 A1* | 6/2008 | Singh et al. | 370/311 |
| 2008/0151848 A1 | 6/2008 | Fischer et al. | |
| 2009/0073871 A1 | 3/2009 | Ko et al. | |
| 2009/0147702 A1 | 6/2009 | Buddhikot et al. | |
| 2009/0247201 A1 | 10/2009 | Ye et al. | |
| 2009/0279449 A1 | 11/2009 | Kneckt et al. | |
| 2009/0303926 A1 | 12/2009 | Den Hartog et al. | |
| 2009/0310571 A1 | 12/2009 | Matischek et al. | |
| 2010/0110948 A1 | 5/2010 | Batta | |
| 2010/0111066 A1 | 5/2010 | Mehta | |
| 2010/0157827 A1 | 6/2010 | Park et al. | |
| 2010/0165947 A1 | 7/2010 | Taniuchi et al. | |
| 2010/0189082 A1 | 7/2010 | Choi et al. | |
| 2010/0226297 A1 | 9/2010 | Kasslin et al. | |
| 2010/0226309 A1 | 9/2010 | Kasslin et al. | |
| 2010/0302947 A1 | 12/2010 | Leppanen et al. | |
| 2010/0304759 A1 | 12/2010 | Leppanen et al. | |
| 2010/0332683 A1 | 12/2010 | Das et al. | |
| 2011/0038349 A1 | 2/2011 | Sun et al. | |
| 2011/0065440 A1 | 3/2011 | Kakani | |
| 2011/0141966 A1 | 6/2011 | Kasslin et al. | |
| 2011/0142028 A1 | 6/2011 | Kasslin et al. | |
| 2011/0142029 A1 | 6/2011 | Kasslin et al. | |

FOREIGN PATENT DOCUMENTS

| | | |
|---|---|---|
| EP | 1545146 | 6/2005 |
| EP | 1 703 701 A1 | 9/2006 |
| EP | 2107732 | 10/2009 |
| WO | 2004/091246 | 10/2004 |
| WO | WO 2005006658 | 1/2005 |
| WO | WO 2008075264 | 6/2008 |
| WO | WO2008094107 | 8/2008 |
| WO | 2009/113798 | 9/2009 |
| WO | WO2010029386 | 3/2010 |

OTHER PUBLICATIONS

International Search Report dated May 10, 2010 for International Application No. PCT/FI2010/050071.

International Search Report mailed Jun. 4, 2010 for International Application No. PCT/FI2010/050069.

International Search Report mailed Sep. 10, 2010 in International Application Serial No. PCT/IB2010/052403, 4pp.

International Search Report mailed Feb. 24, 2011 in International Application Serial No. PCT/FI2010/050803, 4pp.

International Search Report mailed Jan. 21, 2011 in International Application Serial No. PCT/FI2010/050838, 4 pp.

Gao, X, et al. "Optimal ATM size for 802.11 networks in ad hoc mode," DoCoMo Communications lab USA, INFOCOM 2006, Apr. 27, 2006, 3pp.

Jung, E., et al., "An Energy Efficient MAC Protocol for Wireless LANs", Technical Report TR01-017, Dept. of Computer Science, Texas A&M University, Jul. 31, 2011, 11 pp.

Wang, Q. et al, "AwareWare: An Adaptation Middleware for Heterogeneous Environments", IEEE Communications Society, 2001, 6 pp.

Wi-Fi Alliance Technical Committee Quality of Service (Qos) Task Group, WMM (including WMM Power Save Specification) Version 1.1 2004, 36 pages.

International Search Report mailed in International Application Serial No. PCT/FI2010/050801—Date of Completion of Search: Feb. 24, 2011, 4pp.

Cavalcanti et al., "IEEE 802.22-07/0121r1: Proposed text changes to Section 6.21.2 Self-coexistence in IEEE 802.22/ D0.2 Draft Standard" published in Mar. 2007, 26 pp.

Cordeiro et al, "Cognitive PHY and MAC Layers for Dynamic Spectrum Access and Sharing of TV Bands", published by ACM on Aug. 5, 2006, 11 pp.

H. Chen, et al., IEEE P802.11; doc.: IEEE 802.11-10/0828r0, Wireless LANs, Normative Text for 5 MHz Measurement Pilot Frame, Jun. 2010, pp. 1-4.

L. Wang, et al., Proposed SFD Text for 802.11ai, doc.: IEEE 11-12-0406-02-00ai; Passive Scanning Improvement, May 4, 2012; pp. 1-15.

* cited by examiner

POWER MANAGEMENT IN WIRELESS COMMUNICATION SYSTEMS

BACKGROUND

1. Field of Invention

Various embodiments of the present invention pertain generally to wireless link establishment, and in particular, to communication in wireless network environments having beacon periods of varying frequency.

2. Background

Wireless communication has moved from simply being concerned with conveying verbal information to being more focused on total digital interactivity. While originally limited to voice communication (e.g., telephone calls on cellular handsets), enhancements in wireless technology have substantially improved ability, quality of service (QoS), speed, etc. These developments have contributed to an insatiable desire for new functionality. Portable wireless apparatuses are no longer just tasked with making telephone calls. They have become integral, and in some cases essential, tools for managing the professional and/or personal life of users.

The effect of this evolving technology may be seen in instances where a plurality of apparatuses have been replaced with a single multifunction device. The functionality that was formally provided by landline telephones and facsimiles, laptop computers, portable digital assistants (PDA), game systems, music players, digital storage devices may be supported in a single digital communication apparatus. The above functionality may be further supplemented through the provision of applications that were not previously available in portable apparatuses (e.g., directional/tracking features, wireless financial transactions, social networking, etc.).

Such functionality, both existing and emerging, require systems and strategies for seamlessly interconnecting users. In particular, apparatus users will desire a virtually immediate response when applications or functions are executed. Any delay or inaccuracy in the response will negatively impact on a user's satisfaction with the application or function, and thus, may be detrimental to the acceptance of the application or function by the consuming public. Moreover, this functionality must be provided in view of the abilities and/or limitations of each apparatus. For example, exceptional functional performance may not prove beneficial if the impact on resource-constrained apparatuses (e.g., limitations in apparatus energy storage, processing ability, etc.) is so substantial that is becomes prohibitive to users employing the functionality.

SUMMARY

Example embodiments of the present invention may be directed to a method, apparatus, computer program and system for facilitating apparatus interaction while conserving apparatus resources. In accordance with at least one example implementation, apparatuses that interact in a network utilizing a wireless communication medium may stay synchronized with each other through the use of beaconing. For example, one apparatus in the wireless network may transmit beacon frames, and each apparatus participating in the network may synchronize its timing signal function to the beacon frames so that all apparatuses may track the same clock, regardless of whether they are actively communicating with other apparatuses in the network.

However, in additional to a timing signal and associated beacon period indication, the transmitted beacon frames may also include one or more "diluted" beacon period indications. Diluted beacon period indications may define a lower frequency period based on multiples of the beacon period that apparatuses can use to reduce the amount of time that they are active in the network. For example, after an apparatus joins a network by synchronizing with its beacon, the apparatus may elect to operate using a diluted beacon period also defined in the beacon frame. This operational mode may, in some instances, be shared with other apparatuses in the network so that the times at which apparatuses using a diluted beacon period are active may be known.

In accordance with at least one example embodiment of the present invention, an apparatus may invoke active and power conservation states based on standard or diluted beacon periods that are defined within the beacon frames. Active periods, or "awake windows," may be established by additional information (e.g., information elements) that is included in the beacon. Awake windows may establish periods of time during which apparatuses may contend for access to a wireless communication medium. Methodologies based on, for example, channel contention machinery incorporating device prioritization and/or differentiation schemes may be employed to help regulate when each networked apparatus will be awake or inactive (e.g., dozing). Apparatus activity may be managed based on criteria such as state (e.g., whether messages are queued for transmission in the apparatus), role (e.g., whether an apparatus has recently transmitted or received a beacon in the network), etc. This example criteria may then be used alone or in combination with the corresponding standard channel access rules (e.g., contention) that govern operation of the particular wireless communication medium in order to control (e.g., via power state transitions) how networked apparatuses communicate and interact in the wireless network.

The above summarized configurations or operations of various embodiments of the present invention have been provided merely for the sake of explanation, and therefore, are not intended to be limiting. Moreover, inventive elements associated herein with a particular example embodiment of the present invention can be used interchangeably with other example embodiments depending, for example, on the manner in which an embodiment is implemented.

DESCRIPTION OF DRAWINGS

The disclosure will be further understood from the following description of various exemplary embodiments, taken in conjunction with appended drawings, in which.

DESCRIPTION OF EXEMPLARY EMBODIMENTS

Figure 1:
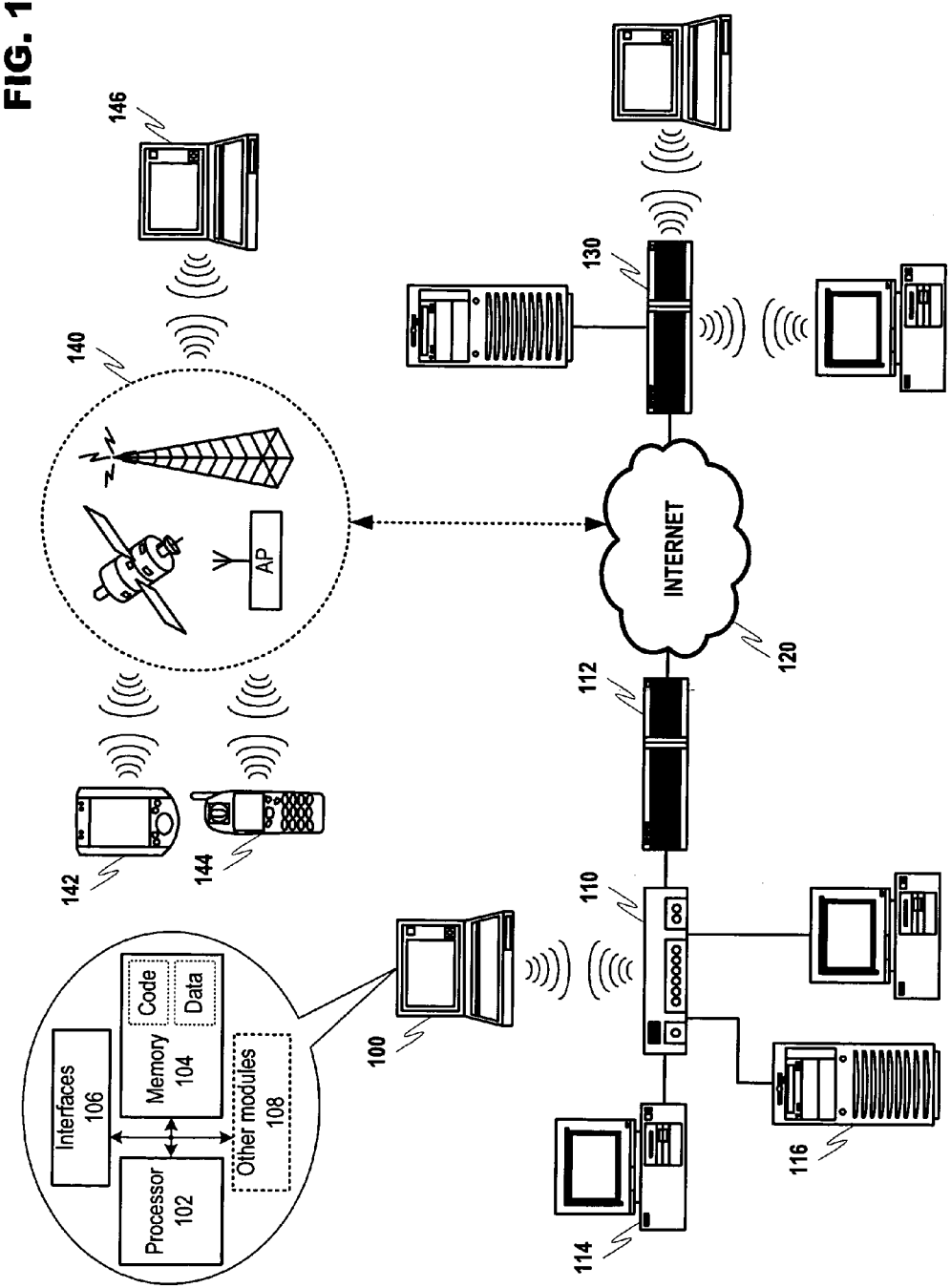
FIG. 1 discloses examples of hardware and software resources that may be utilized when implementing various example embodiments of the present invention.

While the present invention has been described herein in terms of a multitude of example embodiments, various changes or alterations can be made therein without departing from the spirit and scope of the present invention, as set forth in the appended claims.

I. General System with which Embodiments of the Present Invention may be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions, wherein a group of instructions may be constituted, for example, as program code. In at least one scenario, the execution of program code may include receiving input information from other elements in computing device 100 in order to formulate an output (e.g., data, event, activity, etc.). Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 102 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 100 may provide wired and/or wireless support to devices such as computer 114 and server 116. Hub 100 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication.

II. Example Networking Environment

Figure 2:
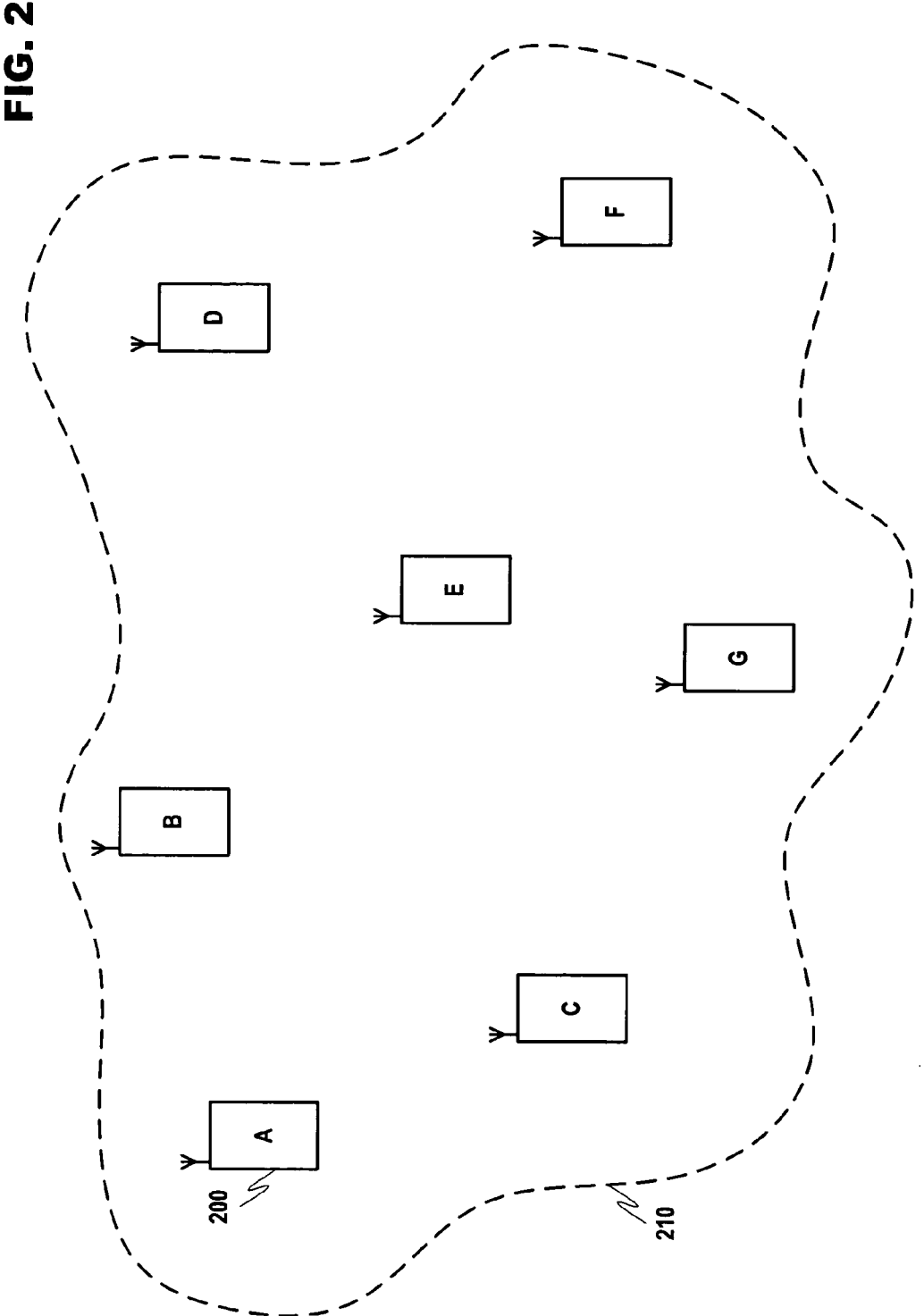
FIG. 2 discloses an example network environment in accordance with at least one example embodiment of the present invention.

FIG. 2 discloses an example operational space that will be utilized to describe various example embodiments of the present invention. The example scenario depicted in FIG. 2 is utilized herein only for the sake of explanation, and therefore, is not intended to limit the scope of the various embodiments of the present invention. Operational spaces may be defined using various criteria. For example, a physical space like a building, theatre, sports arena, etc. may be utilized to define an area in which users interact. Otherwise, operational spaces may be defined in view of apparatuses utilizing particular wireless transports, apparatuses within communication range (e.g., a certain distance) of each other, apparatuses that are in certain classes or groups, etc.

Wireless-enabled apparatuses 200 are labeled "A" to "G" in FIG. 2. Apparatuses 200 may, for example, correspond to any of the wireless-enabled apparatuses that were disclosed in FIG. 1, and may further include at least the resources discussed with respect to apparatus 100. For the sake of example herein, these apparatuses may operate utilizing at least one wireless communication medium in common. That is, all apparatuses in the example of FIG. 2 are at least able to wirelessly communicate with each other within the operational space, and therefore, may participate in the same wireless communication network.

III. Examples of Messaging

Figure 3:
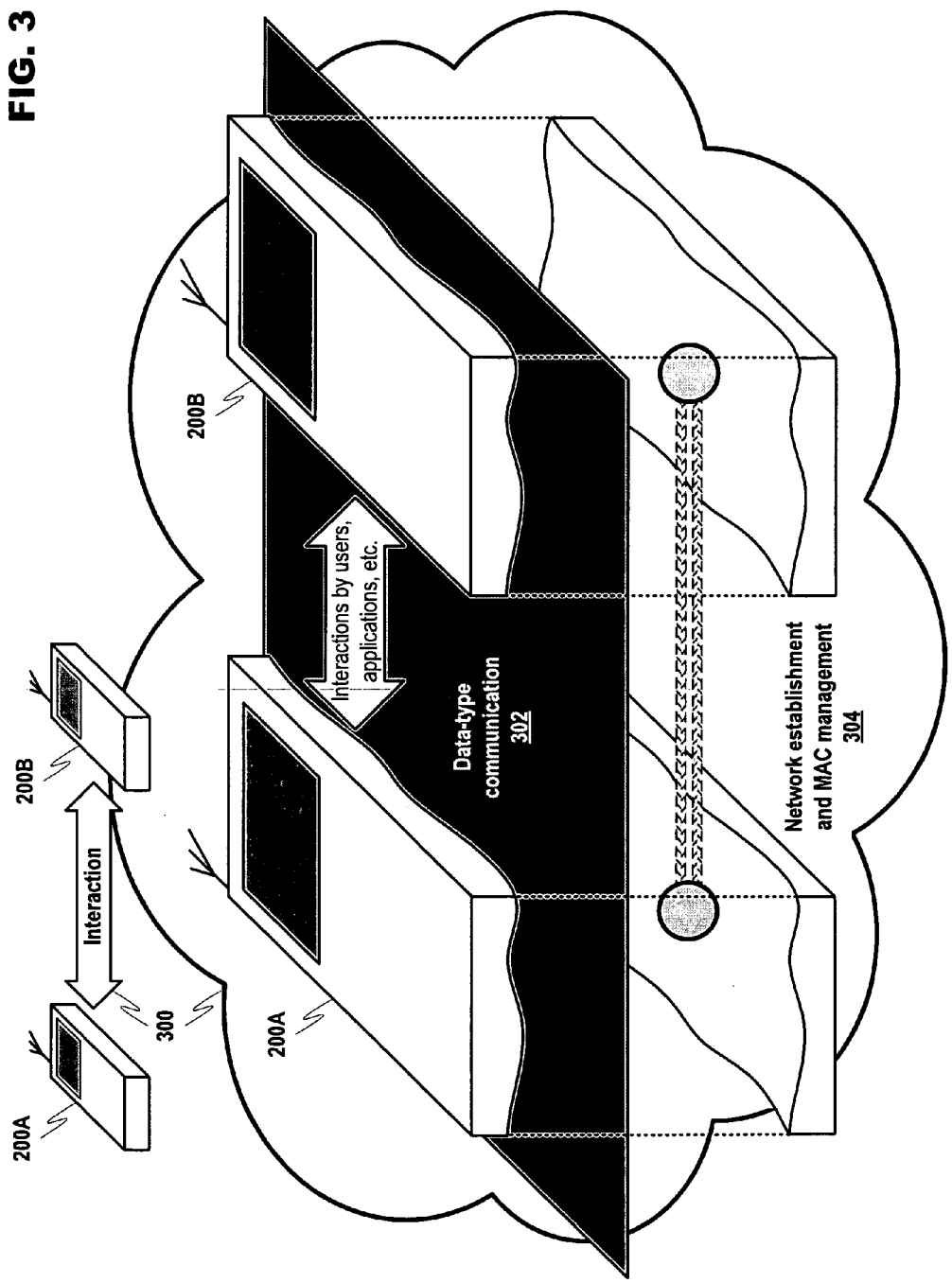
FIG. 3 discloses examples of various types of messaging that may be utilized in accordance with at least one example embodiment of the present invention.

Now referring to FIG. 3, an example of communication between apparatuses in accordance with at least one example embodiment of the present invention is disclosed at 300. While only apparatus 200A and apparatus 200B are shown, the disclosed example scenario is being utilized only for the sake of explanation herein, and is not intended to limit the scope or applicability of any embodiment of the present invention. Moreover, the various example embodiments of the present invention, such as disclosed herein, may be implemented in order to facilitate wireless interaction between two or more apparatuses existing in an operational space.

Additional detail with respect to communication example 300 is disclosed further in FIG. 3. Apparatus 200A may have communication requirements that require interaction with apparatus 200B. For example, these requirements may comprise interactions by apparatus users, applications residing on the apparatuses, etc. that trigger the transmission of messages that may be generally classified under the category of data-type communication 302. Data-type communication may be carried out using tiny messages that may be transmitted between apparatus 200A and 200B. However, some form of wireless network link or connection must first be established before any data type communication messages 302 may be exchanged.

Network establishment and MAC management messages 304 may be utilized to establish and maintain an underlying wireless network architecture within an operating space that may be utilized to convey data type communication messages 302. In accordance with various example embodiments of the present invention, messages containing apparatus configuration, operation and status information may be exchanged to transparently establish wireless network connections when, for example, an apparatus enters an operating space. Network connections may exist between any or all apparatuses existing within the operating space, and may be in existence for the entire time that an apparatus resides in the operating space. In this way, data-type communication messages 302 may be conveyed between apparatuses over already existent networks (a new network connection does not need to be negotiated at the time the message is to be sent), which may in turn reduce response delay and increase quality of service (QoS).

Figure 4:
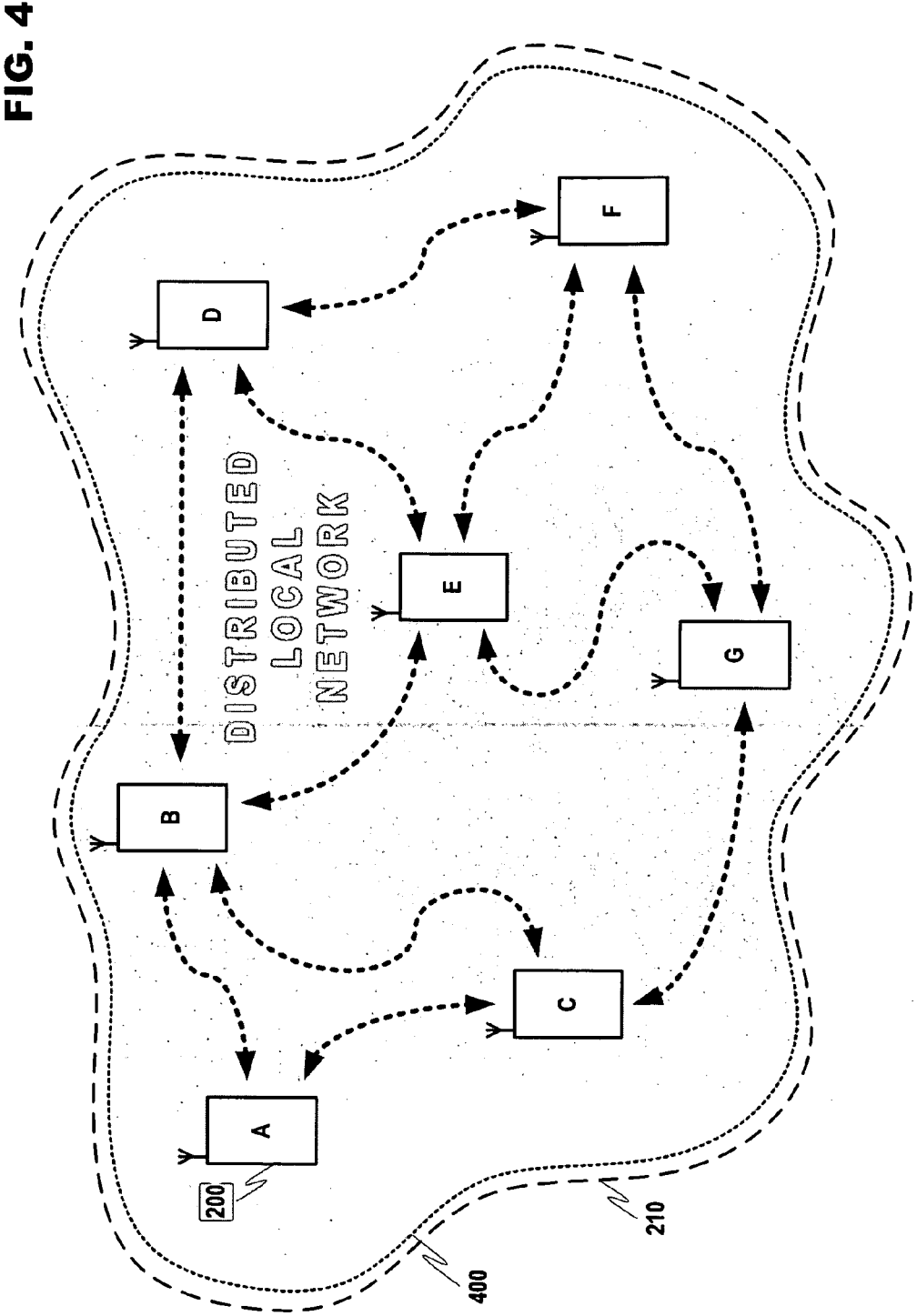
FIG. 4 discloses an example of message propagation that may result in distributed local web formation in accordance with at least one example embodiment of the present invention.

The example scenario disclosed in FIG. 2 is now revisited in FIG. 4, which shows an example of distributed local network formation utilizing automated network establishment and MAC management messages 304. Apparatuses 200 that enter into operational space 210 may immediately begin to formulate network connections through the exchange operational information. Again, the exchange of this information may occur without any prompting from, or even knowledge of, a user. An example of this interactivity is shown in FIG. 4, wherein various network establishment and MAC management messages 304 are exchanged between apparatuses A to G. In accordance with at least one example embodiment of the present invention, messages may be exchanged directly between an originating apparatus (e.g., the apparatus that is described by the information elements in a message) and a receiving apparatus. Alternatively, messages corresponding to one or more apparatuses in operational space 210 may be forwarded from one apparatus to another, thereby disseminating the information for multiple apparatuses.

IV. Example Operational Parameter: Diluted Beacon Period

Figure 5:
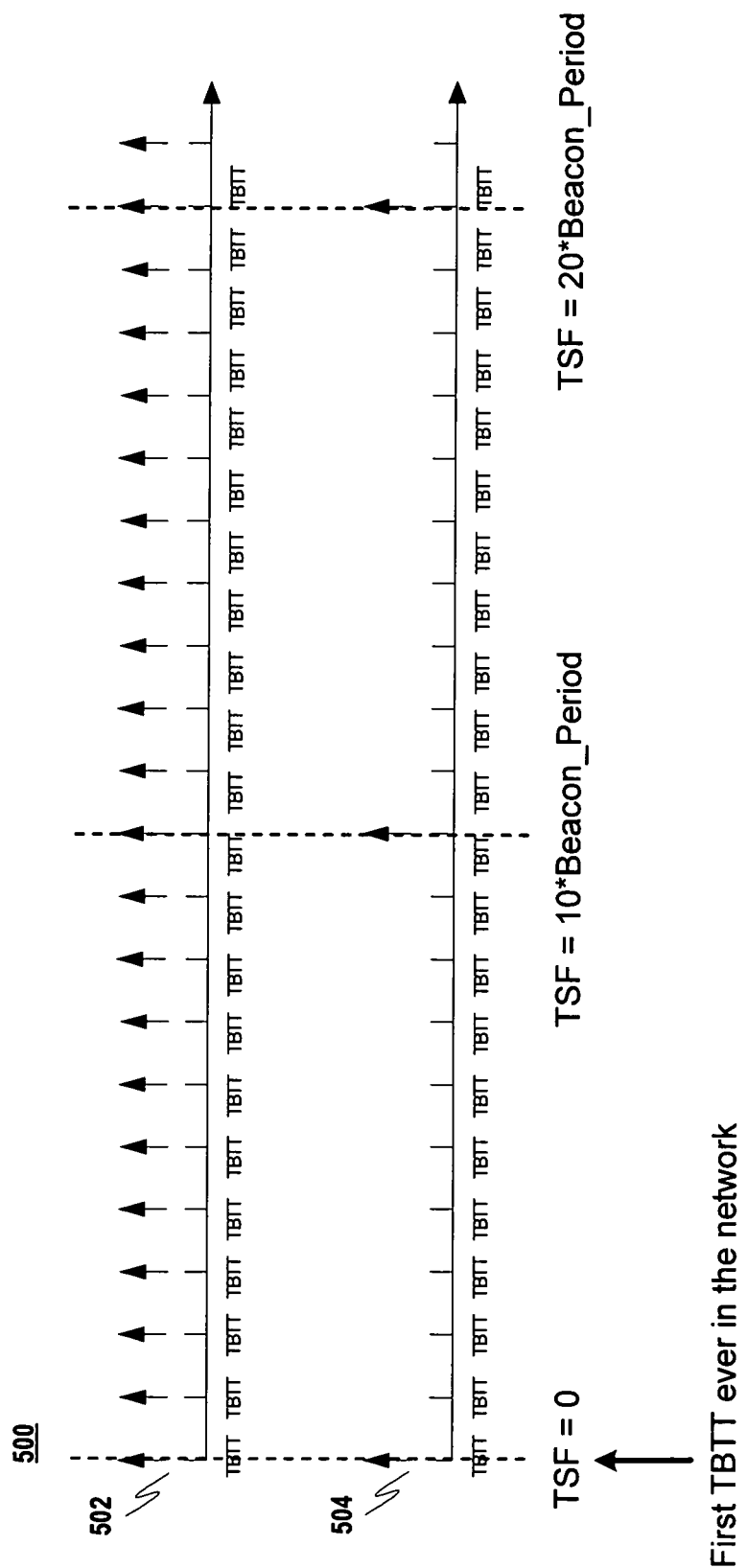
FIG. 5 discloses example beacon implementations that are usable in accordance with at least one example embodiment of the present invention.

An example of information that may be communicated in network establishment and MAC management messages 304 (e.g., through the use in an information element) is now disclosed in FIG. 5. The activity flow disclosed at 500 represents an example implementation using selected features of wireless local area networking or WLAN (as set forth in the IEEE 802.11 specification). However, various embodiments of the present invention are not strictly limited to WLAN, and thus, may be applied to various wireless network architectures using various wireless mediums.

The WLAN logical architecture comprises stations (STA), wireless access points (AP), independent basic service sets (IBSS), basic service sets (BSS), distribution systems (DS), and extended service sets (ESS). Some of these components map directly to hardware devices, such as stations and wireless access points. For example wireless access points may function as bridges between stations and a network backbone (e.g., in order to provide network access). An independent basic service set is a wireless network comprising at least two stations. Independent basic service sets are also sometimes referred to as an ad hoc wireless network. Basic service sets are wireless networks comprising a wireless access point supporting one or multiple wireless clients. Basic service sets are also sometimes referred to as infrastructure wireless networks. All stations in a basic service set may interact through the access point. Access points may provide connectivity to wired local area networks and provides bridging functionality when one station initiates communication to another station or with a node in a distribution system (e.g., with a station coupled to another access point that is linked through a wired network backbone).

In wireless network architectures like WLAN, beacon signals may be utilized to synchronize the operation of networked apparatuses. In situations where new ad hoc networks are being created, the initiating apparatus may establish beaconing based on it owns clock, and all apparatuses that join the network may conform to this beacon. Similarly, apparatuses that desire to join an existing wireless network may synchronize to the existing beacon. In the case of WLAN, apparatuses may synchronize to beacon signals utilizing a timing synchronization function (TSF). The timing synchronization function is a clock function that is local to an apparatus that synchronizes to and tracks the beacon period.

An example of a beacon signal is shown in FIG. 5 at 502 wherein a target beacon transmission time (TBTT) indicates the targeted beacon transmission. This time may be deemed "targeted" because the actual beacon transmission may be a somewhat delayed from the TBTT due to, for example, the channel being occupied at TBTT. The apparatuses that are active in the network may communicate with each other in accordance with the beacon period. However, there may be instances where it may not be beneficial, and may possibly even be detrimental, for apparatuses to be active during each beacon period. For example, apparatuses that do not expect frequent communication within the wireless network may not benefit from being active for every beacon period. Moreover, apparatuses with limited power or processing resource may be forced to waste these precious resources by the requirement of being active for every beacon period.

In accordance with at least one example embodiment of the present invention, functionality may be introduced utilizing the example distributed wireless network described above to allow apparatuses to operate at a standard beaconing rate, or alternatively, using a "diluted" beaconing rate. "Diluted" beaconing may entail a beaconing mode operating at a lower frequency than the beaconing rate originally established in the network. Diluted beaconing may be based on information (e.g., information elements) that is included in network beacon frames, wherein the included information may express one or more diluted beacon rates as multiples of the beacon. Using the beacon and the one or more associated diluted beacon period indications contained within beacon frames, networked apparatuses may elect to operate (e.g., via random contention) based either on the beacon or a diluted beacon period. In particular, all apparatuses may synchronize to the same initial target beacon transmission time (TBTT), for example when TSF=0, and may then count the number periods that occur after the initial TBTT based on the internal TSF function. In this way, apparatuses operating using a diluted beacon period may be active on TBTT counts that corresponds to the multiple defined by the diluted beaconing period.

An example diluted beacon rate of every $10^{th}$ TBTT is disclosed in FIG. 5 at 504. The decision on a beaconing rate to utilize may be handled by each apparatus individually, (e.g., in the protocol stacks that manage operation of a radio modem). All apparatuses, however, will operate based on a beacon interval that remains the same for the lifetime of the network. In view of the requirement that the beacon interval remain unchanged for the duration of the wireless network, the diluted beacon signal may be expressed as a multiple of the beacon signal. In the example disclosed in FIG. 5, and as set forth above, the first TBTT is equivalent TSF=0. This initial value is dictated by the apparatus that formed the network. Other apparatuses that subsequently join the network may adopt this beacon interval parameter and TBTT timing. For example, the TBTT at TSF=0 is the "base point" that determines when beacons are transmitted. All the devices in network update their own TSF counters as per legacy synchronization rules, and from the TSF they may determine the particular TBTT in which to participate in beaconing assuming that, regardless of the beaconing rate, the first beacon was transmitted at TSF=0.

For example, in a network with four apparatuses where devices 1, 2 and 4 operate using a diluted beaconing mode having an example frequency (e.g., a time period between beacon transmissions) of every 6 h TBTT all apparatuses may remain synchronized, but only device 3 would be active (e.g., "competing") in beaconing periods 1, 2, 3, 4 and 5, while all apparatuses may participate in TBTT 0, TBTT 6, TBTT 12, etc. Therefore, there can be at least two different beacon periods among the apparatuses, and possibly further diluted beacon periods as each apparatus may select its own diluted beaconing period based on the original beaconing period and the one or more associated diluted beacon period indications transmitted therewith.

In accordance with at least one example embodiment of the present invention, beacons will contain a diluted beacon period parameter. The diluted beacon period parameter may, for example, be carried in vendor-specific information elements (IEs). Diluted beacon period parameter values may remain the same for the lifetime of the network. However, should there be need for more flexibility, other beacon rate periods may be predefined, and all of the predefined beacon rate periods may signaled in a manner similar to the diluted beaconing rate.

V. Examples of Awake Windows

Figure 6:
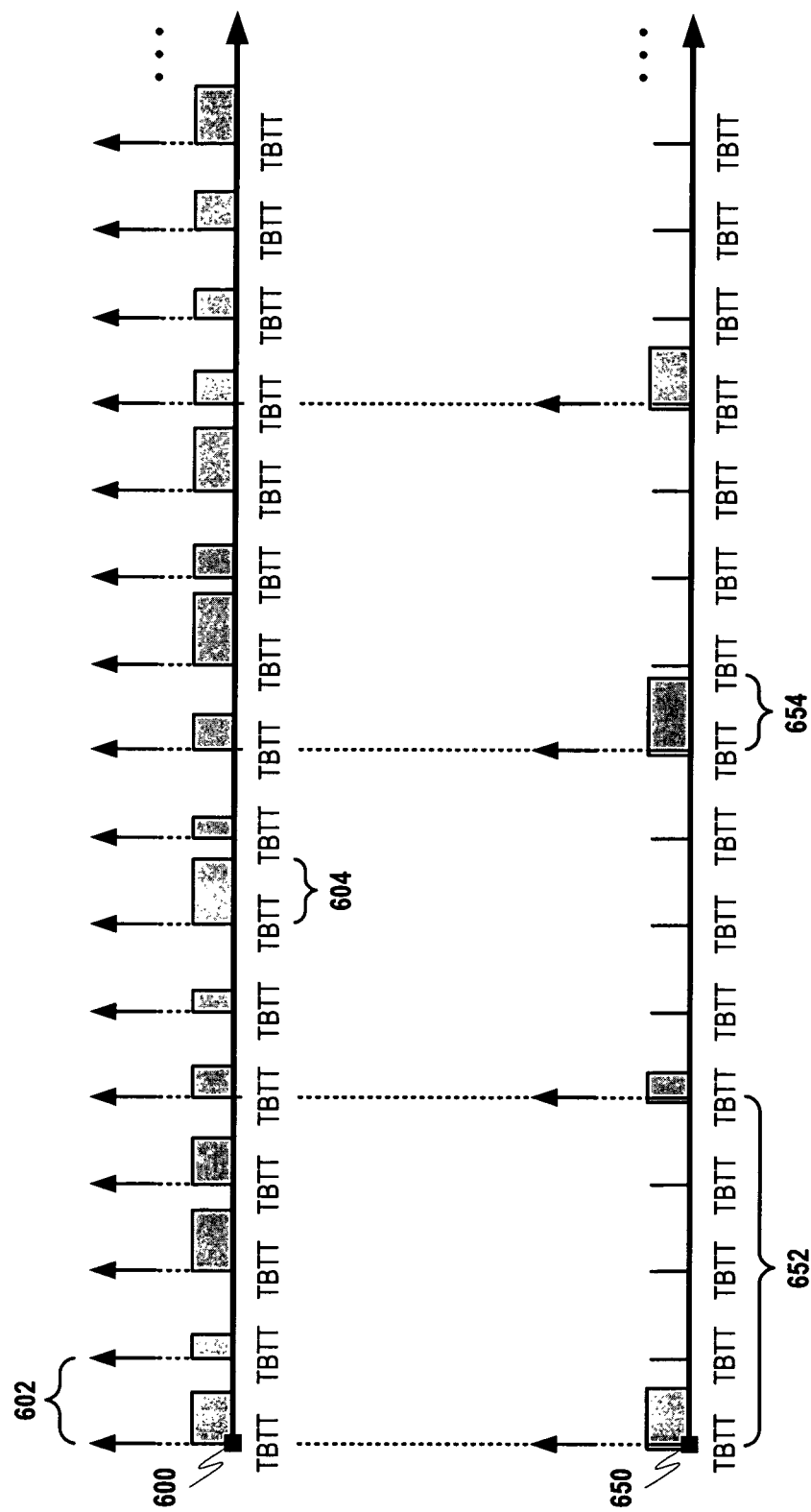
FIG. 6 discloses an example of awake windows in accordance with at least one example embodiment of the present invention.

FIG. 6 discloses an example implementation of "awake windows" in accordance with at least one embodiment of the present invention. Similar to FIG. 5, a "standard" network beacon (e.g., the beacon established by the apparatus that formed the network) is shown at 600. Each target beacon transmit time (TBTT) may represent a beacon frame that is transmitted by an apparatus in the network (or at least times at which beacon transmissions were targeted, barring any delays). Thus, the interval shown at 602 may therefore define the standard beacon period.

Possible awake windows for an apparatus that is participating in the network are further shown in FIG. 6, an example of which is identified at 604. These active periods occur in accordance with each transmitted TBTT, and therefore, may be deemed aligned with the normal network beacon period. These awake windows do not necessarily represent that an apparatus has planned activity (e.g., messages queued for transmission) during these time periods. On the contrary, they are merely periods of time when apparatuses will be in active, and therefore, will be able to transmit messages to, and/or receive messages from, other apparatuses in the network.

The behavior of another example apparatus in accordance with at least one embodiment of the present invention is further disclosed at 650. While all apparatuses in the network will operate based on the same origin point (e.g., TSF=0) and normal beacon period (e.g., as set forth by the TBTT), each apparatus may select an operational mode based upon the one or more diluted beacon period indications that are transmitted in the beacon. For example, the apparatus corresponding to the activity disclosed at 650 is operating utilizing diluted beacon period 652, which is a multiple "4" in this scenario. Therefore, diluted beacon period 652 may occur per every four TBTTs. Awake windows, for example as shown at 654, may also occur in accordance with the diluted beacon period 652. In at least one example implementation, the awake windows may began just prior to the commencement of the diluted beacon period.

The duration of awake windows, while configured at constant duration by a predetermined information element (IE) in the beacon, may end up being variable in actual practice. For example, the awake window by a MAC parameter that is similar to the beacon interval and diluted beacon period parameters. A host in the beaconing apparatus may determine it and provides it to the modem for transmission in the beacon. It may be communicated using a general or vendor specific information element (IE) as with the beacon interval and diluted beacon period. Upon awake window expiration apparatuses may attempt to transition to a "doze" or sleep state. However, the transition to doze state may, in actuality, happen earlier or later in accordance with control methodologies that will be discussed with respect to FIG. 7-8.

Figure 7:
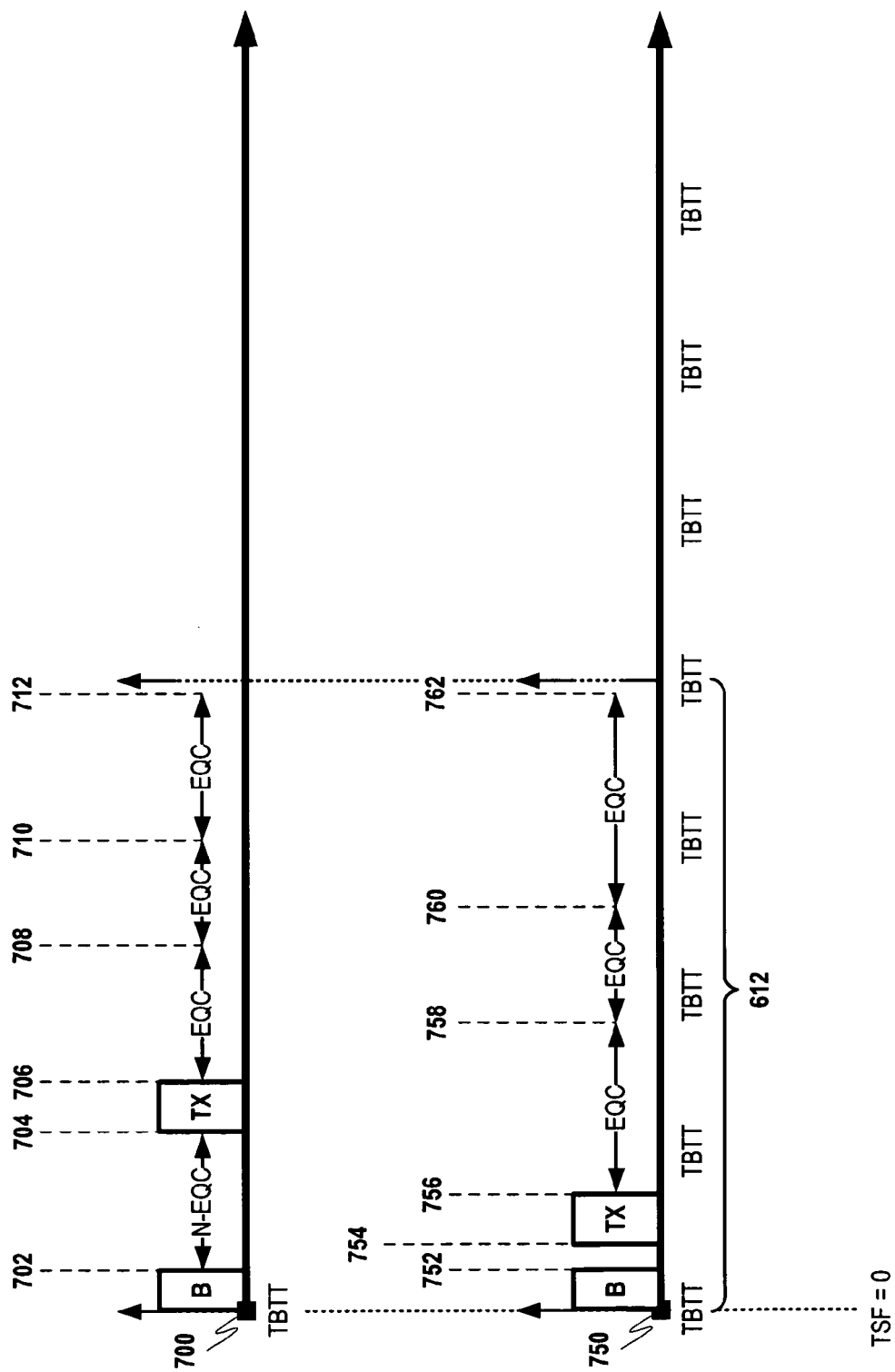
FIG. 7 discloses examples of access control strategies in accordance with at least one example embodiment of the present invention.

FIG. 7 discloses channel access control configurations that may be implemented in accordance with various example embodiments of the present invention. Initially two channel access states may be defined: a non-empty queue contention (N-EQC) state and an empty queue contention (EQC) state. When apparatuses have no messages (frames) queued for transmission in transmit buffers, the device may be deemed in an EQC state. Alternatively, apparatuses may be deemed in an N-EQC state when there is at least one frame awaiting transmission.

The N-EQC state may comprise optional implementations: "Legacy" 700 and "Beacon Prioritized" 750. Using Legacy implementation 700, upon receiving or transmitting a beacon, channel contention may be executed as in legacy devices, for example, as defined by the channel access rules specified in the particular wireless communication medium. Legacy implementation 700 represents an example of channel contention in accordance with an existing set of access control rules between 702 and 704. Once the apparatus gains access to media at 704 it will obtain a transmission opportunity (TXOP) during which it may transmit frames to the network (e.g., if one or more frames are queued for transmission. "TX" as shown between 704 and 706 in FIG. 7 represents the transmission of any queued messages. Further, frames may be received from the network as acknowledgements to the transmitted frames in the "TX" period.

In Beacon Prioritized implementation 750, the apparatus that has transmitted the network beacon is permitted to continue transmitting any frames that are queued for transmission in its transmit buffers. The apparatus obtains a TXOP for beacon transmission, and once it has transmitted the beacon at 752 it may automatically obtain a new TXOP, as shown at 754, to transmit any frames that are pending in its transmit buffers. In the disclosed example the new TXOP may start after a short interframe space (SIFS) period following the end of the beacon frame, which is represented in example 750 by the space shown between 752 and 754.

Once the apparatus has completed transmission (e.g., emptied its transmission buffers), it shall enter into an EQC state as shown in implementations 700 and 750 at 706 and 756, respectively. If an apparatus has no frames for transmission during a beacon interval, the device transition directly into an EQC state after the beacon reception/transmission (e.g., at 702, 752). When in the EQC state apparatuses may try to obtain a TXOP for a given number of times (determined, for example, by a "RepeatEmptyQueueContention" parameter). Upon obtaining a TXOP, apparatuses without pending messages may attempt to obtain a new TXOP as shown at 708/710 and 758/760 in implementations 700 and 750, respectively, instead of initiating the transmission of a frame sequence. Devices that obtain a number of TXOPs that is equal to a predetermined threshold value (e.g., RepeatEmptyQueueContention times) during a beacon interval may enter into doze or sleep state. In example implementations 700 and 750 in FIG. 7 this may occur at 712 and 762, respectively. All of these events may happen before awake window 612 expires. Moreover, example legacy implementation 700 and example beacon prioritized implementation 750 both assume that the message transmissions between 704 and 706, as well as 754 and 756, respectively, succeed, and thus, no frames are pending for (re)transmission beyond this point.

Figure 8:
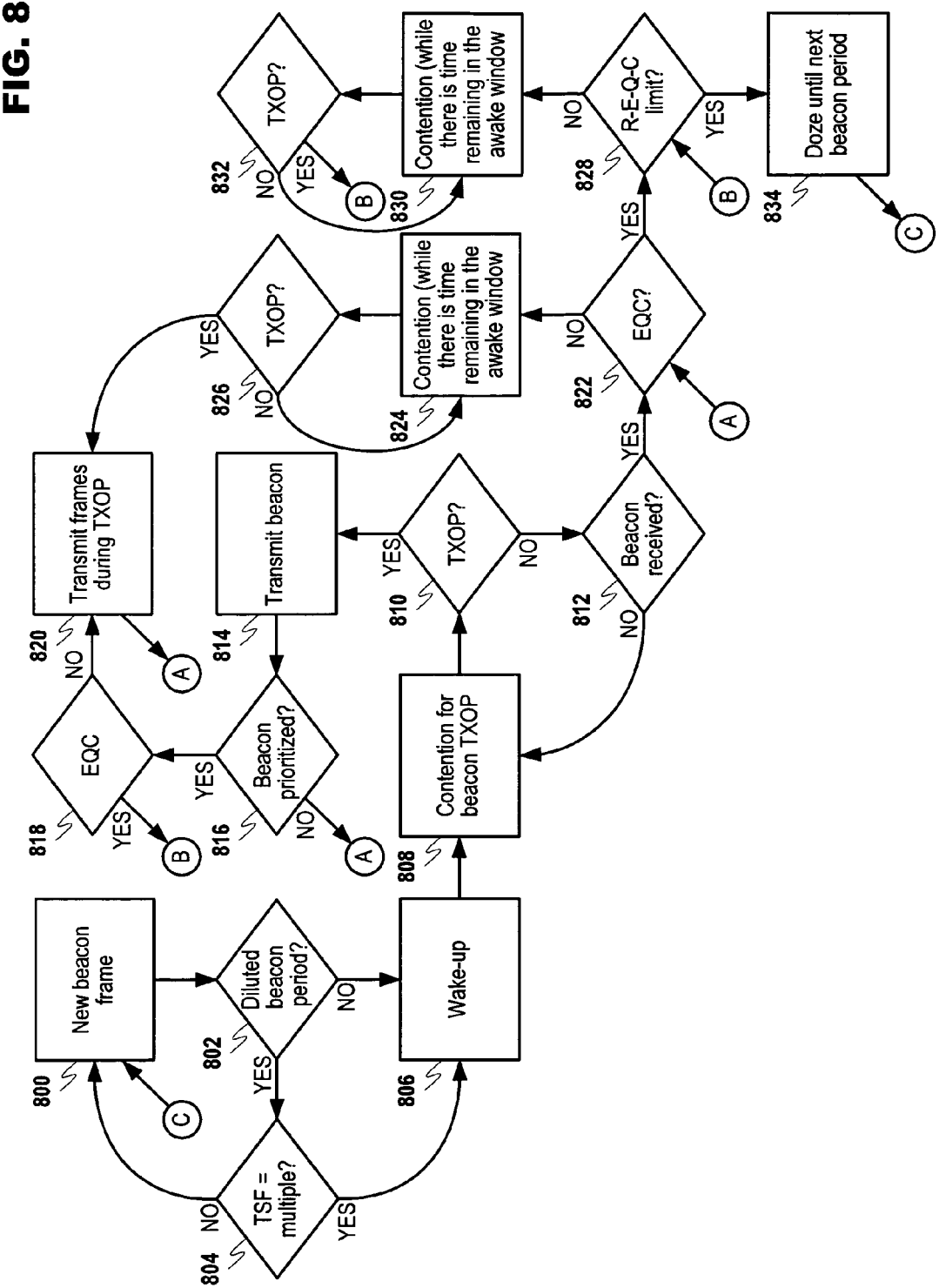
FIG. 8 discloses a flowchart for an example communication control process in accordance with at least one example embodiment of the present invention.

A flowchart of an example communication control process in accordance with at least one example embodiment of the present invention is now described in FIG. 8. A beacon frame may initiate in step 800. A determination may then be made in step 802 as to whether the apparatus is in an operational mode that utilizes the beacon period associated with the timing signal in the beacon frame, or alternatively, the current operational mode is based on a diluted beacon period associated with the timing signal that is also defined in the beacon frame. If the operational mode utilizes a diluted beacon period, then in step 804 a further determination may be made as to whether a time synchronization function (TSF) operating in the apparatus to track the number of beacons transmitted in the lifetime of a wireless network corresponds to a multiple of the number of beacons defined, for example by the associated diluted beacon indication.

If the beacon period is being utilized in the current operational mode (step 802) or the TSF is a multiple of the diluted beacon period (step 804), the process may move to step 806 wherein the apparatus may wake-up. For example, waking-up an apparatus may comprise the apparatus moving from an inactive (dozing) mode to an active (awake) mode in accordance with a duration defined by an awake window. Awake windows may be predetermined periods of time set forth, for example, by information elements (IEs) transmitted as part of the beacon frame. The apparatus may then attempt to access a wireless communication medium in step 808. This access may comprise an attempt to secure a transmit opportunity (TXOP) in accordance with contention rules that, for example, may correspond to the particular wireless communication medium that is being utilized to create a wireless network within an operational space.

Contention may continue in step 808 until either a TXOP is granted in step 810 or a beacon is received in step 812. If a TXOP is realized in step 810, a beacon may be transmitted in step 814. In networks configured to operate in a "beacon prioritized" mode (e.g., as determined in 816) the transmission of a beacon may be followed by the determination of whether any frames are pending for transmission in the apparatus, for example, whether the apparatus is in an empty queue contention (EQC) state or in a non-empty queue contention (N-EQC) state. If in step 818 the apparatus is determined to have one or more frames queued for transmission (is not in an EQC state), then in step 820 the apparatus may transmit some or all of the one or more queued frames during the TXOP. In accordance with at least one example embodiment of the present invention, an awake window may be extended past its predetermined duration in situations where, for example, an apparatus obtains a TXOP and/or is in the process of accessing the wireless communication medium for the purpose of transmitting or receiving frames, etc.

If in step 816 it is determined that the network is not configured for beacon prioritized operation, or alternatively if in step 812 a beacon was received by the apparatus, then in step 822 a determination may then be made as to whether messages are awaiting transmission in the apparatus (N-EQC state) or if no frames are currently pending (EQC state). If frames are queued for transmission (e.g., the apparatus is not in an EQC state), the apparatus may attempt to obtain a TXOP via contention in steps 824 and 826. Contention may continue until a TXOP is secured or the awake window comes to an end. Provided that a TXOP is obtained during the awake window, the process may proceed to step 826 where some or all of the one or more frames are transmitted.

If the apparatus is determined to be in an EQC state (e.g., no messages are currently queued for transmission) in either steps 818 or 822, the process may then proceed to step 828 wherein a determination is made as to whether the RepeatEmptyQueueContention parameter is at its limit (e.g., the number of TXOPs obtained while the apparatus is operating in an EQC state equals the number defined in the parameter). Contention may continue in step 830 until a TXOP is obtained in step 832 or the current awake window ends. Upon realizing a TXOP, the process may again check whether the RepeatEmptyQueueContention parameter is at its limit in step 828. When the parameter reaches its limit, the apparatus may enter a doze state until the next beacon period (step 834). The process may then return to step 800 to prepare for the next beacon frame.

Further to the above, the various example embodiments of the present invention are not strictly limited to the above implementations, and thus, other configurations are possible.

For example, apparatuses in accordance with at least one embodiment of the present invention may comprise means for determining whether to wake up an apparatus based on a timing signal and at least one of an associated beacon period indication or a diluted beacon period indication, means for, if the apparatus is awake and obtains access to a wireless communication medium, transmitting a beacon and then contending for an additional transmit opportunity based on a determined network configuration and channel access state, means for, if the apparatus is awake and receives a beacon, contending for a transmit opportunity based on the determined channel access state, and means for transitioning the apparatus to a doze state.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

What is claimed is:

1. A method, comprising:
   determining at an apparatus that is awake during a beacon interval, whether frames are queued for transmission;
   contending, at the apparatus, for a first transmit opportunity to gain access to a wireless communication medium;
   if the apparatus gains access to the wireless communication medium and has no frames queued for transmission, contending for additional transmit opportunities during the beacon interval until gaining a predetermined number of transmit opportunities or until a predetermined awake period has expired; and transitioning the apparatus to a doze state when gaining the predetermined number of transmit opportunities or determining that the predetermined awake period has expired.

2. The method of claim 1, further comprising:
determining, based on a timing signal and at least one of an associated beacon period indication or a diluted beacon period indication whether to wake up the apparatus.

3. The method of claim 2, wherein the timing signal and at least one of an associated beacon period indication or a diluted beacon period indication are determined based on a timing synchronization function that is synchronized to a beacon period of a wireless network.

4. The method of claim 1, wherein the contending for an additional transmit opportunity is based on a determined network configuration and channel access state; and
wherein network configuration comprises whether or not the network is operating in a beacon prioritized configuration.

5. The method of claim 4, wherein the channel access state is non-empty queue contention when it is determined that frames are queued for transmission in the apparatus, and is empty queue contention when no frames are queued for transmission in the apparatus.

6. The method of claim 5, wherein the apparatus is granted a transmit opportunity after a beacon is transmitted when the apparatus is determined to be in a beacon prioritized configuration and in a non-empty queue contention state.

7. The method of claim 5, wherein after a beacon is received, transmitting one or more frames over the wireless communication medium when the apparatus is granted a transmit opportunity and is determined to be in a non-empty queue contention state.

8. A computer program product comprising computer executable program code recorded on a non-transitory computer readable medium, comprising:
computer program code configured to determine whether to wake up at an apparatus that is awake during a beacon interval, whether frames are queued for transmission;
computer program code configured to, contend, at the apparatus, for a first transmit opportunity to gain access to a wireless communication medium;
computer program code configured to, if the apparatus gains access to the wireless communication medium and has no frames queued for transmission, contend for additional transmit opportunities during the beacon interval until gaining a predetermined number of transmit opportunities or until a predetermined awake period has expired; and
computer program code configured to transition the apparatus to a doze state when gaining the predetermined number of transmit opportunities or determining that the predetermined awake period has expired.

9. The computer program product of claim 8, further comprising:
computer program code configured to determine, based on a timing signal and at least one of an associated beacon period indication or a diluted beacon period indication whether to wake up the apparatus.

10. The computer program product of claim 9, wherein the timing signal and at least one of an associated beacon period indication or a diluted beacon period indication are determined based on a timing synchronization function that is synchronized to a beacon period of a wireless network.

11. The computer program product of claim 8, wherein the contending for an additional transmit opportunity is based on a determined network configuration and channel access state; and
wherein network configuration comprises whether or not the network is operating in a beacon prioritized configuration.

12. The computer program product of claim 11, wherein the channel access state is non-empty queue contention when it is determined that frames are queued for transmission in the apparatus, and is empty queue contention when no frames are queued for transmission in the apparatus.

13. The computer program product of claim 12, wherein the apparatus is granted a transmit opportunity after a beacon is transmitted when the apparatus is determined to be in a beacon prioritized configuration and in a non-empty queue contention state.

14. The computer program product of claim 12, wherein after a beacon is received, transmitting one or more frames over the wireless communication medium when the apparatus is granted a transmit opportunity and is determined to be in a non-empty queue contention state.

15. An apparatus, comprising:
a processor;
a memory including computer program code;
the memory and the computer program code configured to, with the processor, cause the apparatus at least to:
determine, when the apparatus is awake during a beacon interval, whether frames are queued for transmission
contend, at the apparatus, for a first transmit opportunity to gain access to a wireless communication medium;
if the apparatus gains access to the wireless communication medium and has no frames queued for transmission, contend for additional transmit opportunities during the beacon interval until gaining a predetermined number of transmit opportunities or until a predetermined awake period has expired; and
transition the apparatus to a doze state when gaining the predetermined number of transmit opportunities or determining that the predetermined awake period has expired.

16. The apparatus of claim 15, further comprising:
the memory and the computer program code configured to, with the processor, cause the apparatus at least to:
determine, based on a timing signal and at least one of an associated beacon period indication or a diluted beacon period indication whether to wake up the apparatus.

17. The apparatus of claim 16, wherein the timing signal and at least one of an associated beacon period indication or a diluted beacon period indication are determined based on a timing synchronization function that is synchronized to a beacon period of a wireless network.

18. The apparatus of claim 15, wherein the contending for an additional transmit opportunity is based on a determined network configuration and channel access state; and
wherein network configuration comprises whether or not the network is operating in a beacon prioritized configuration.

19. The apparatus of claim 18, wherein the channel access state is non-empty queue contention when it is determined that frames are queued for transmission in the apparatus, and is empty queue contention when no frames are queued for transmission in the apparatus.

20. The apparatus of claim 19, wherein the apparatus is granted a transmit opportunity after a beacon is transmitted when the apparatus is determined to be in a beacon prioritized configuration and in a non-empty queue contention state.

21. The apparatus of claim 19, wherein after a beacon is received, transmitting one or more frames over the wireless communication medium when the apparatus is granted a transmit opportunity and is determined to be in a non-empty queue contention state.

* * * * *